United States Patent
Price et al.

(10) Patent No.: US 6,269,850 B1
(45) Date of Patent: Aug. 7, 2001

(54) MULTIPATHWAY PRODUCT DISTRIBUTION SYSTEM AND METHOD

(75) Inventors: Richard T. Price, Lehi; Byron D. Larson, South Jordan, both of UT (US)

(73) Assignee: Multi-Fill, Inc., West Jordan, UT (US)

( * ) Notice: Subject to any disclaimer, the term of this patent is extended or adjusted under 35 U.S.C. 154(b) by 0 days.

(21) Appl. No.: 09/454,896

(22) Filed: Dec. 3, 1999

(51) Int. Cl.$^7$ ........................................................ B65B 1/06
(52) U.S. Cl. ........................... 141/238; 141/234; 141/248
(58) Field of Search ........................... 141/234, 236–238, 141/242–245, 248

(56) References Cited

U.S. PATENT DOCUMENTS

| | | | |
|---|---|---|---|
| 4,147,081 | * | 4/1979 | Pellaton ................................. 83/407 |
| 4,344,823 | * | 8/1982 | Stratmann et al. .................... 201/41 |
| 4,968,519 | * | 11/1990 | Catelli .................................. 426/496 |
| 5,073,393 | * | 12/1991 | Defrancisci ........................... 426/508 |
| 5,168,905 | * | 12/1992 | Phallen ................................. 141/237 |
| 5,911,252 | * | 6/1999 | Cassel .................................. 141/234 |
| 6,024,258 | * | 2/2000 | D'Alterio ............................. 222/361 |
| 6,105,637 | * | 8/2000 | VerMehren ........................... 141/248 |
| 6,145,552 | * | 11/2000 | Price et al. ........................... 141/135 |

* cited by examiner

*Primary Examiner*—J. Casimer Jacyna
(74) *Attorney, Agent, or Firm*—Thorpe North & Western

(57) ABSTRACT

An apparatus and method for dividing a single stream of long, sticky product into a plurality of product streams, comprising a product input conduit for providing a single stream of product, and having a rough portioner disposed therein for dividing the stream of product into discrete portions. The discrete portions are then dropped into a first diverter mechanism comprised of a reciprocating slide block mechanism, which selectively directs the discrete portions into two outlet streams. Additional diverter mechanisms may be disposed in the outlet streams to further divide and redirect the product into any number of final outlet streams, such as four, eight, etc. The final outlet streams are directed toward container filling machines which precisely measure the product and place it into containers as desired. The multipathway product distribution system is controlled by a computerized logic controller which can accommodate the failure of any one or more container filling machines in any combination by stopping flow to any combination of final outlet conduits while maintaining uninterrupted operation of the remainder of the system.

18 Claims, 5 Drawing Sheets

MULTIPATHWAY PRODUCT DISTRIBUTION SYSTEM AND METHOD

BACKGROUND OF THE INVENTION

1. Field of the Invention

This invention relates to product filling machines for packaging food products and the like. More particularly, the present invention relates to an improved system for dividing a single product flow into multiple pathways in order to supply multiple product packaging machines.

2. State of the Art

In the food production and packaging industry, products known as long goods typically require special handling. Long goods include products such as spaghetti, linguini, and fettuccini and similar products. These products present unique handling problems because of their length and flexibility, and also because they are typically sticky. These characteristics make it difficult to handle and package the product without damaging it, such as by cutting or crushing noodles. Those in the industry will understand that each increment of damage to the product causes a corresponding reduction in the value of the final product. Accordingly, product handling and packaging operations are judged by two criteria: speed and lack of damage to the product.

In view of these twin criteria, dividing a large continuous stream of long goods, such as cooked spaghetti, into a plurality of smaller streams presents unique difficulties. In the product packaging industry, it is well known to divide a stream of product into several smaller streams and divert those smaller streams to individual packaging machines. For example, this approach is routinely used with dry or granular products such as nuts, berries, hard candies, or cigarettes. This approach is also used with liquid or mostly liquid products such as soup, stew, fruit cocktail, etc. In such operations, the product stream, normally flowing or rolling in an open conduit, is redirected by means of diversion gates which move from one position to another to send the entire flow of product down one or the other of two branching channels. A series of such gates can be used to divide one stream into many.

While a system of diversion gates works well with granular or liquid products, it is not suitable for long goods such as cooked spaghetti for several reasons. First, the long noodles tend to snag on the diversion gate, either preventing the gate from closing completely, or causing the noodles to be cut and damaged. This system also tends to cause clogs because the entire flow is diverted all at once, rather than just a portion of the flow. Additionally, the noodles which snag on the diversion gates also tend to cause clogs. All of these failures of prior art product diversion systems result in lost time, lost product, and needless maintenance effort and expense.

Additionally, prior art product stream diversion methods frequently cannot adequately cope with sudden changes in the system. For example, where a product diversion system is configured to divide one stream into four to supply four container filling machines, if one of the four filling machines malfunctions and has to be shut down, many prior art product diversion systems cannot automatically cope with this sudden change in conditions. Prior art systems do not automatically detect the malfunction, and do not automatically adjust the product distribution to shut down one outlet line, and redistribute and balance the remaining flow to each of the remaining lines. In such a situation, significant worker time and expertise is required to adjust the entire system to allow the product run to continue. In many cases, this results in down time for the entire operation.

It would thus be desirable to have a product distribution system that can quickly and efficiently divide a stream of long, sticky goods into a plurality of streams without damaging the product. It would also be desirable to have a product distribution system that can automatically detect the malfunction of any of its elements or of product filling machines associated with it, and automatically adjust the entire system to accommodate the malfunction without requiring shut down or significant operator attention.

SUMMARY OF THE INVENTION

It is therefore an advantage of the present invention to provide a multipathway product distribution system and method which is suitable for redirecting long, sticky products without damaging the product.

It is another advantage of this invention to provide a multipathway product distribution system which is less likely to clog or malfunction, and requires less manitenance.

It is another advantage of this invention to provide a multipathway product distribution system which is computer controlled in conjunction with a series of container filling machines.

It is another advantage of this invention to provide a multipathway product distribution system and method which can accommodate the malfunction of any one or more container filling machines by redirecting the product flow to the remaining filling machines without interruption or operator effort.

The above and other advantages are realized in an apparatus and method for dividing a single stream of long, sticky product into a plurality of product streams. The system comprises a product input conduit for providing a single stream of product, and having a rough portioner disposed therein for dividing the stream of product into discrete rough portions. The rough portions are then dropped into a first diverter mechanism comprised of a reciprocating slide block mechanism, which selectively directs the rough portions into two outlet streams. Additional diverter mechanisms may be disposed in the outlet streams to further divide and redirect the product into any number of final outlet streams, such as four, eight, etc. The final outlet streams are directed through conduits toward container filling machines which precisely measure the product and place it into containers as desired.

Some of the above advantages are also realized in a multipathway product distribution system further comprising a computerized logic controller integrated into the system. The logic controller can accommodate the failure of any one or more container filling machines in any combination by adjusting the motion of the slide blocks and rough portioner to stop flow to any combination of final outlet conduits while maintaining uninterrupted operation of the remainder of the system.

Other advantages and features of the present invention will be apparent to those skilled in the art, based on the following description, taken in combination with the accompanying drawings.

DETAILED DESCRIPTION OF THE PREFERRED EMBODIMENT

Figure 1A:
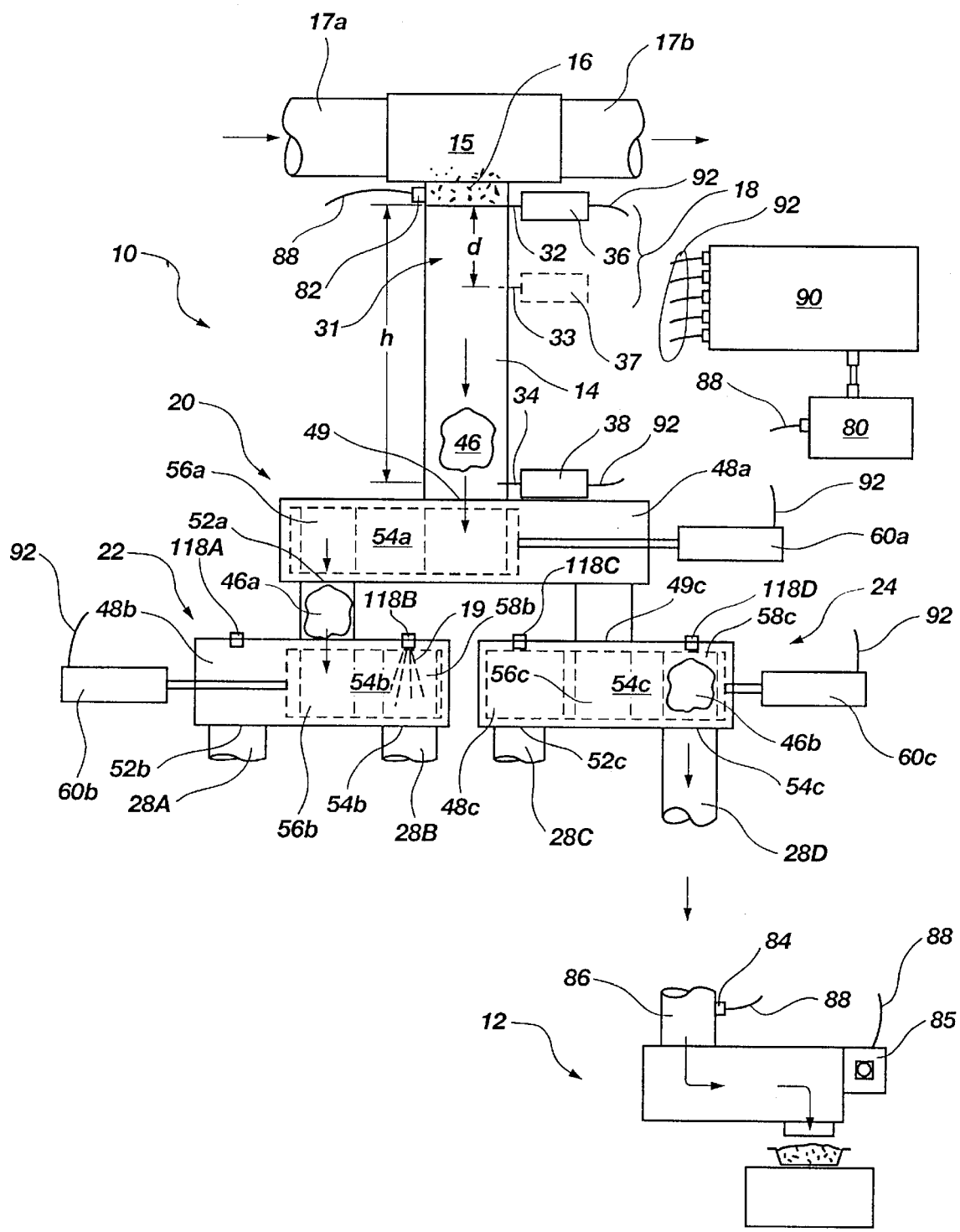
FIGS. 1A–D provide a schematic diagram of a four branch multipathway product distribution system of the present invention in operational relationship to a container filling machine, through each of its four phases of operation.

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

FIGS. 1A–1D provide a schematic diagram of a four outlet multipathway product distribution system 10 according to the present invention. These figures show the system through each of its four phases of operation in relationship to one product packaging machine 12. Multipathway product distribution system 10 generally comprises an inlet tube 14, which receives the incoming product 16, a rough portioner 18, knife gate 34, first slide block assembly 20, subsequent slide block assemblies 22 and 24, and final outlet conduits 28A–D, which will each typically lead to a product packaging machine 12, only one of which is shown in FIGS. 1A–D. Inlet 14 is connected to and receives product from mainline 17 by means of overflow mechanism 15, which is described in more detail below. Product packaging machine 12 may be a bag filler, a tray filling machine, or any other suitable packaging machine known to those skilled in the art. Inlet conduit 14 is preferably a 4 ¾" diameter tube. However, while the various product conduits shown in the attached figures, including inlet conduit 14 and final outlet conduits 28A–D, are shown as round in cross-section, it will be apparent that other cross-sectional shapes may also be used without affecting the operation of the system. Likewise, various materials may be used for the conduits, including stainless steel, aluminum, polymers, and so forth.

Rough portioner 18 is disposed within inlet tube 14 as near to its top as practicable, and preferably comprises a needle separator 32 powered by pneumatic cylinder 36. It will be apparent that other types of rough portioners could be utilized, such as a slide gate, a rotary separator, etc. However, a needle separator is preferred because it is gentle to the product. The needle separator 32 comprises a plurality of parallel needles or wires, which are moveable from a first position wherein the needles extend across the cross-section of the inlet conduit 14, to a second position wherein the needles are retracted out of the conduit to allow product to pass. Because of the rapidity of its operation, the timed reciprocation of needle separator 32 is not apparent from FIGS. 1A–1D. In each of these figures separator 32 is shown extended, and knife gate 34 is shown retracted.

To measure and dispense a rough portion 46, the pneumatic cylinder 36 preferably causes needle separator 32 to rapidly retract from blocking conduit 14 for a brief time, and then extends it again to block the conduit. Naturally, when the separator retracts, product retained thereabove will begin to fal into conduit 14. Then, when the needles are extended, the stream is blocked again, thus allowing only a discrete quantity of product, designated for example at 46, to fall toward opening 49 in the bottom of conduit 14, into aperture 58a in first slide block 54a. It will be apparent that the time interval during which needle separator 32 is retracted will determine the volume of the discrete quantity. The needle separator also provides the advantage that the abrupt beginning and end of its motion tends to shake the product, thus reducing the amount of product that clings or hangs.

Portion 46 is intended to be rough only. Precise measurement and disbursement of the product is preferably accomplished by product packaging machine 12. For example, in one configuration of the preferred embodiment of the invention, rough portions 46 comprise approximately 30 oz. of spaghetti, while the product packaging machine 12 dispenses more accurately measured portions of 9 oz. each.

While the timed retraction and extension of needle separator 32 is the preferred method of measuring discrete quantities, particularly of long sticky goods such as spaghetti, it will be apparent that other methods of rough portioning may also be employed. For example, rather than a single needle separator which measures product by time, a second needle separator 33 and pneumatic cylinder 37 (shown in phantom lines in FIG. 1A) could also be provided some distance d below needle separator 32. A discrete portion would be separated by alternately extending and retracting the first and second needle separators 32 and 33, so that a portion of product is first trapped between the needle separators, and then dropped by the retraction of second needle separator 33 while the remainder of the product flow is retained above needle separator 32. It will be apparent that the volume of the discrete quantity would depend upon the diameter of conduit 14 and the distance d between the first and second needle separators, which distance could be mechanically adjustable, such as by means of a sliding collar or tube.

Located at the bottom of inlet conduit 14 is knife gate 34, powered by pneumatic cylinder 38. This knife gate is preferably placed as near to the bottom of conduit 14 as possible, and serves to catch and hold slow moving product to prevent its being damaged in first slide block 20. For example, in the case of long sticky product such as spaghetti, when needle separator 32 extends and the measured quantity drops, some noodles will tend to hang down, and others which may be stuck to them may gradually slide down and then drop off after the first slide block has begun its movement. Consequently, these slow moving noodles would be damaged if not prevented from continuing into opening 49 at the bottom of inlet 14. Accordingly, a substantially solid knife gate 34 is provided, and may be extended across opening 49 between measurements or whenever first slide block 54a is moving. Then, when the next portion is ready to be dropped, the slide gate retracts, allowing the slow moving product to be swept away by the next rough portion. The inventors have found that use of the slide gate is generally only necessary when the system is operating in a non-standard mode, such as when only three of four packaging machines are operating, as described below.

Needle separator 32 and knife gate 34 are preferably separated by some distance h to prevent hanging product from being damaged in first slide block assembly 20. It will be apparent that distance h will depend on the nature of the product. For example, with 10" spaghetti noodles, the inventors have found that a distance of h=20" is preferable to prevent noodles which hang from separator 32 and other noodles which hang from those noodles from dangling down past opening 49.

Figure 2:
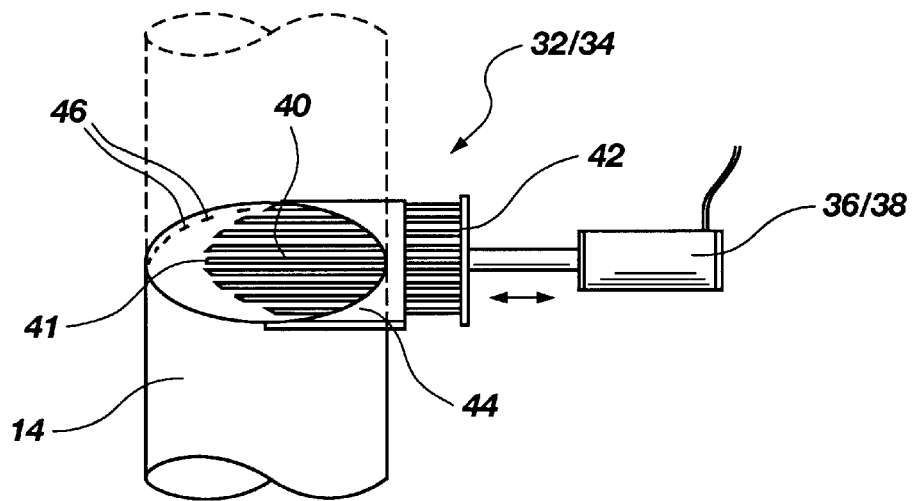
FIG. 2 shows a pictorial view of the needle separator of the present invention.

FIG. 2 provides a pictorial view of needle separator 32. Needle separator 32 generally comprises a plurality of parallel rods 40 with blunt pointed free ends 41, which are attached at their opposite ends to transverse frame 42. Rods 40 are preferably formed of stainless steel, though other strong metallic and non-metallic materials may also be used, such as aluminum, polymers, etc. Frame 42 is connected to pneumatic cylinder 36, which causes the rods to extend or retract through manifold 44 as desired from a first extended position wherein rods 40 extend entirely across the opening in inlet conduit 14 to block the passage of product 16, to a second position where rods 40 are all retracted out of the conduit to allow product to pass therethrough. In FIG. 2, rods 40 are shown in a position midway between the first position and second position.

Each rod in the group of rods 40 is preferably formed to have a length approximately corresponding to the transverse distance across the cross section of the inlet conduit 14 at the location of the individual rod, so that when the group of rods is extended, pointed free end 41 of each rod 40 approximately simultaneously arrives at the opposite curved inside of the conduit. The rods preferably do not actually contact the opposite inside surface of the conduit, but are just clear of the surface in the extended position. As can be seen, this configuration requires that each rod be a different length than those on either side of it, causing the free end of the group of rods 40 to outline a semi-circular shape as shown. The inside surface of conduit 14 opposite manifold 44 is preferably formed with a plurality of sockets 46, which are aligned with and receive free ends 41 of rods 40 when extended. This configuration provides additional support to the rods when extended, and also helps keep them properly aligned.

Needle separator 32 provides several significant advantages to the present invention. Because it is comprised of a plurality of parallel rods with spaces between them, and because the needles are blunt on their ends, the separator is gentle to delicate products such as cooked noodles, etc. For example, when separator 32 is retracted, allowing spaghetti to flow through conduit 14, and then is extended through the product stream, the needles will thread through the mass of noodles, pushing them aside as needed, without cutting them, as would tend to happen with a flat plate separator, for example. Then, any noodles that dangle through the spaces between rods 40 will either stay with the mass above the upper separator, or drop with measured quantity 46, or in the case of slowly dropping noodles, will be caught by knife gate 34. By virtue of this design, the present invention significantly reduces damage to the product while still handling and portioning it quickly and efficiently.

Figure 3:
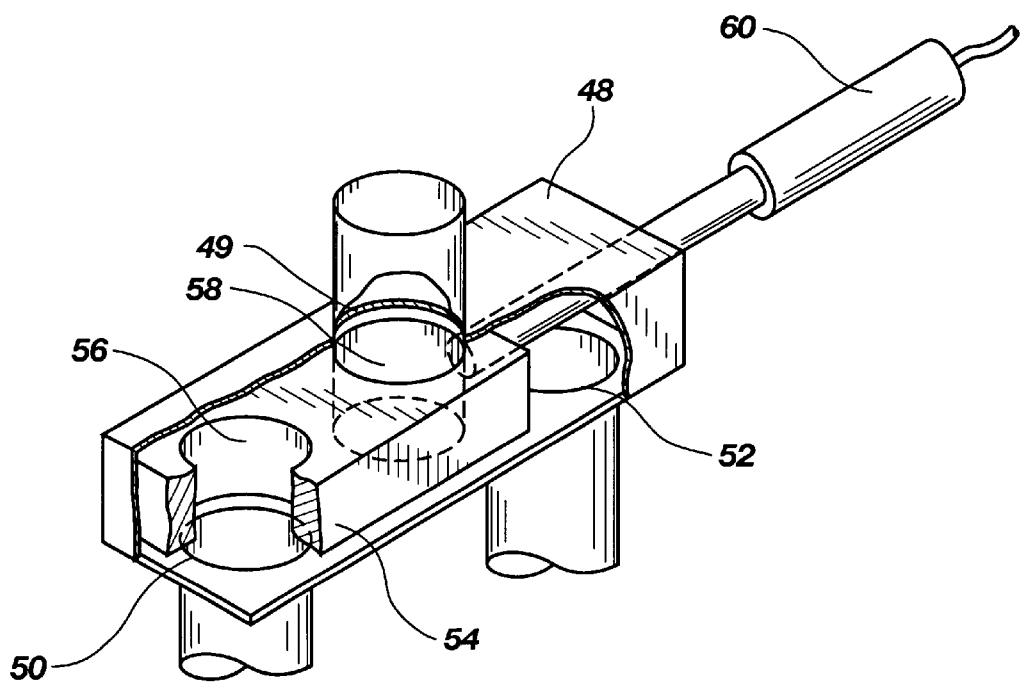
FIG. 3 shows a partial cross-sectional pictorial view of a slide block product diverter of the present invention.

A detailed, partial cross-sectional pictorial view of a typical slide block assembly is given in FIG. 3. As shown, each slide block assembly generally comprises a housing 48 having an inlet opening 49, first outlet opening 50, second outlet opening 52, slide block 54 having a first aperture 56 and a second aperture 58, and a reciprocal actuation means 60 for causing linear reciprocation of the slide block within housing 48. Actuation means 60 may be any mechanical or electromechanical device capable of causing the slide block to reciprocate as required, and as shown herein is preferably a pneumatic cylinder. In FIGS. 1A–D, first slide block assembly 20, second slide block assembly 22, and third slide block assembly 24 are shown with similar numbering, with the designations a, b, and c, respectively.

Slide blocks 54 are preferably formed as a substantially solid rectangular block of material, such as UHMW (Ultra High Molecular Weight) Polyethylene. First and second apertures 56 and 58 extend entirely through the block from the top surface to the bottom, and are preferably configured to have a size significantly larger than the intended volume of rough portion 46, so that when the rough portion is contained within an aperture there is less likelihood of damage to the product due to the motion of slide block 54. For example, long sticky products may tend to stick to the sides of the aperture, and protrude through inlet opening 49. When the slide block slides past the inlet opening, these long pieces will then be cut by the scissor-like action of opposite edges of apertures sliding past each other. However, if the aperture is significantly larger than the required volume, the rough portion is more likely to be entirely contained within the aperture, with no product protruding up through the aperture, reducing the likelihood of damage to the product.

Referring back to FIG. 1A, subsequent slide blocks 22 and 24 have their inlet openings 49b and 49c connected to first and second outlet openings 50a and 52a, respectively, of first slide block assembly 20, to create four final outlet streams. In this manner, any number of slide block assemblies may be similarly interconnected to divide the incoming product stream into any number of final streams. As shown in FIG. 1A, the final streams exit through final outlet conduits 28A–D, which could alternatively be connected to inlets of additional subsequent slide block assemblies for further division of the product stream.

Second and third slide block assemblies 22 and 24 are preferably provided with jets 118A–D, positioned above outlet conduits 28A–D. These jets are provided to inject a fluid stream 19, depicted in FIG. 1A in second aperture 58b of second slide block 54b. Fluid stream 19 may comprise hot or cold water, air, or other gas, depending on the product, to help eject portion 46 from aperture 56 or 58 at the appropriate time. These jets may also be used to flush clogs. Similar jets, though not shown, may also be provided with first slide block assembly 20 to assist in moving the product along or to flush clogs.

FIGS. 1A–1D show the preferred four outlet multipathway product distribution system 10 in each of its four phases of operation. In the following description of these phases of operation, each slide block will be referred to as having a first position when disposed at the left side of the corresponding housing, and a second position when disposed at the right side of the housing. In FIG. 1A, first slide block 54a is shown in its first position, second slide block 54b in its second position, and third slide block 54c in its second position. First aperture 56a of first slide block 54a is disposed below the lower end of inlet conduit 14, and second aperture 58a is disposed above second outlet opening 52a. In operation, rough portion 46 drops into second aperture 58a, and a previous rough portion 46a, which was previously deposited in first aperture 56a, simultaneously drops through first outlet 50a, through inlet 49b of second slide block assembly 22, and into first aperture 56b, disposed therebelow. Also simultaneously, another rough portion 46b, previously deposited in second aperture 58c of third slide block 54c drops therefrom and into final outlet conduit 28D, toward product packaging machine 12. This is phase one.

Figure 1B:
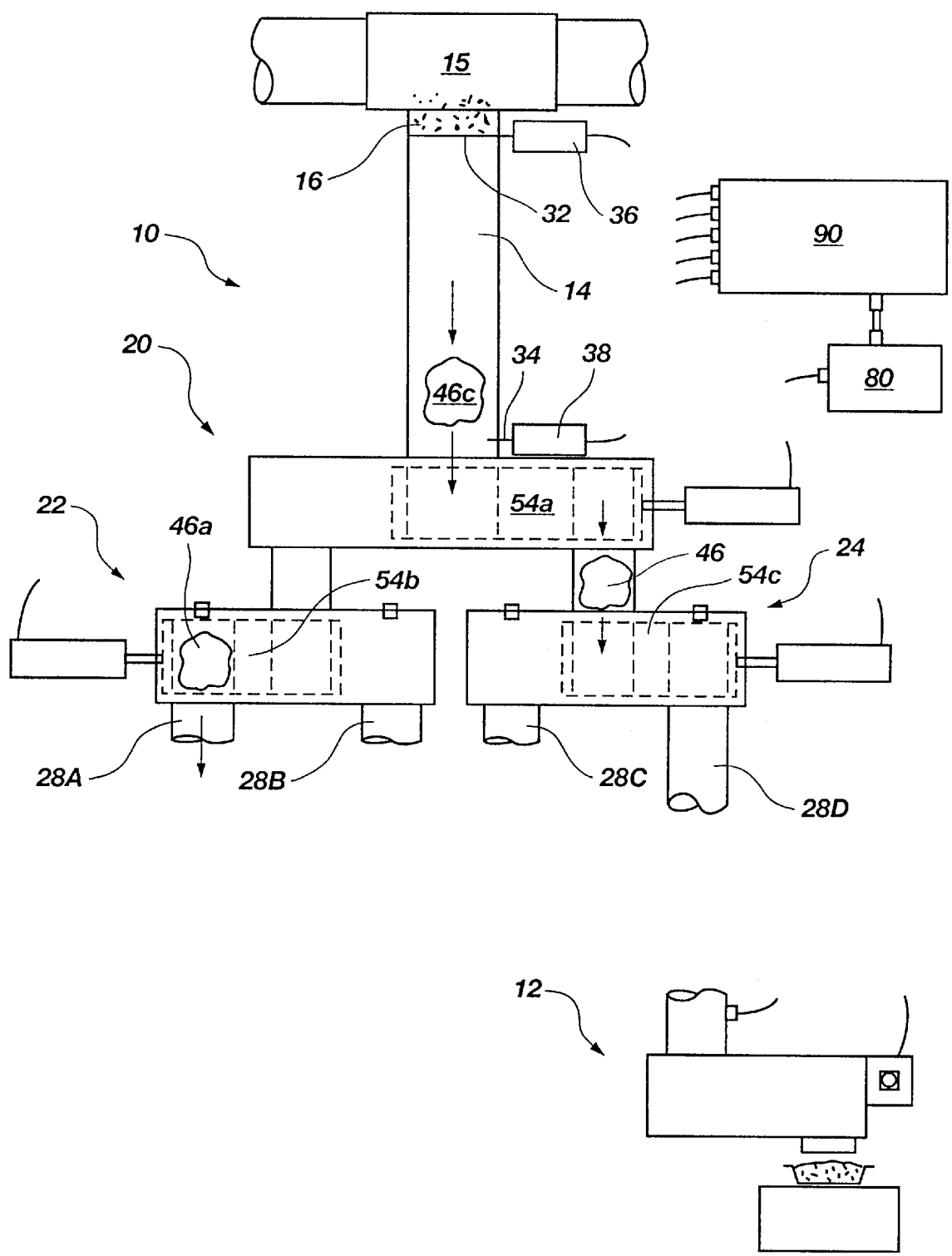

Phase two is depicted in FIG. 1B. Between phase one and phase two, first slide block 54a moves from its first position to its second position, second slide block 54b moves from its second position to its first position, and third slide block 54c remains in its second position, as in phase one. Simultaneously, the rough portioner measures another rough portion 46c, which drops into first aperture 56a, now disposed below inlet conduit 14. Rough portion 46, previously deposited in second aperture 58a drops into first aperture 56c of third slide block 54c, and rough portion 46a, previously deposited in first aperture 56b of second slide block 54b drops into final outlet conduit 28A, toward another final packaging machine (not shown). This is phase two.

Figure 1C:
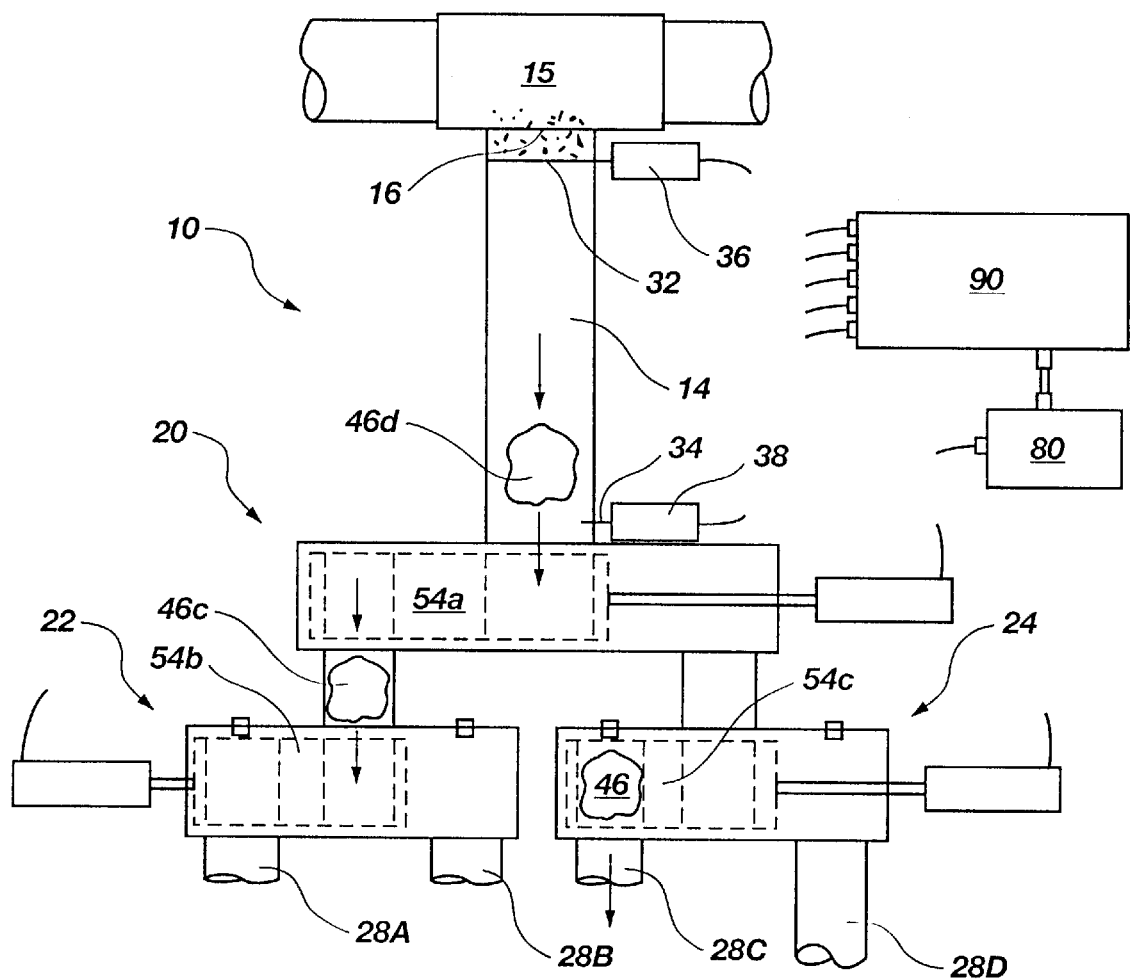
Figure 1C:
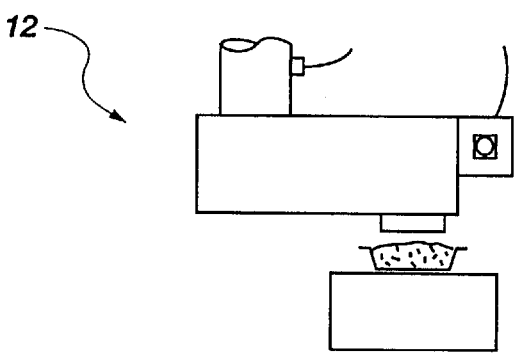

Phase three is depicted in FIG. 1C. Between phase two and phase three, first slide block 54a moves from its second position back to its first position, second slide block 54b remains in its first position as in phase two, and third slide block 54c moves from its second position back to its first position. Simultaneously, again, the rough portioner measures another rough portion 46d, which drops into second aperture 58a, again disposed below inlet conduit 14. Rough portion 46c, previously deposited in first aperture 56a drops into second aperture 58b of second slide block 54b, and rough portion 46, previously deposited in first aperture 56c of third slide block 54c drops into final outlet conduit 28C, toward another final packaging machine (not shown). This is phase three.

Figure 1D:
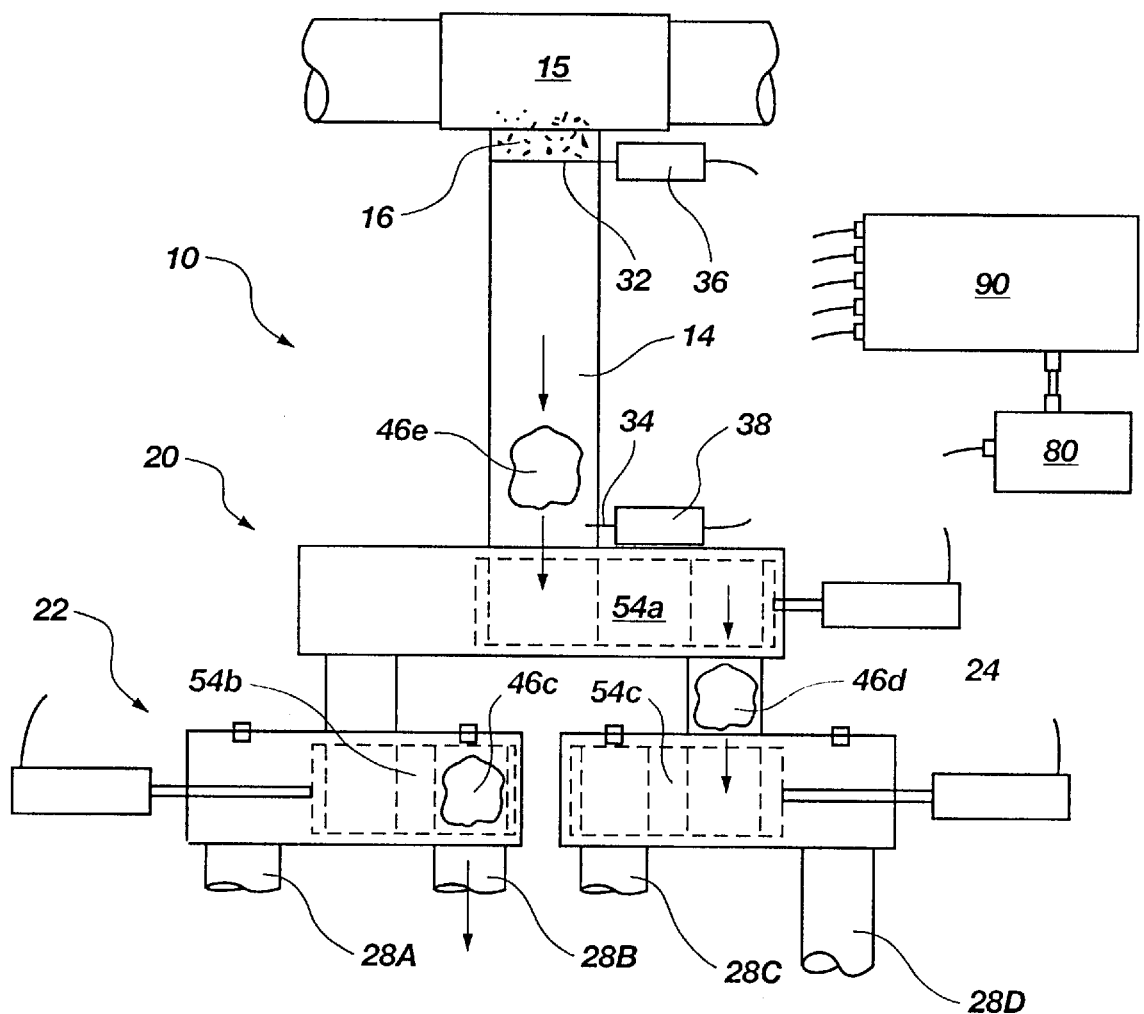
Figure 1D:
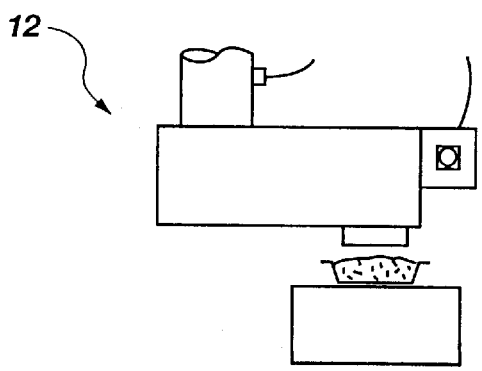

Phase four is depicted in FIG. 1D. Between phase three and phase four, first slide block 54a moves from its first position to its second position, second slide block 54b moves from its first position to its second position, and third slide block 54c remains in its first position, as in phase three. Simultaneously, the rough portioner measures another rough portion 46e, which drops into first aperture 56a, now disposed below inlet conduit 14. Rough portion 46d, previously deposited in second aperture 58a drops into second aperture 58c of third slide block 54c, and rough portion 46c, previously deposited in second aperture 58b of second slide block 54b drops into final outlet conduit 28B, toward a fourth final packaging machine (not shown). This is phase four.

Following phase four, the apparatus returns to the condition of phase one, portion 46d takes the place of portion 46b, dropping through final outlet conduit 28D, portion 46e takes the place of portion 46a, dropping into first aperture 56b of second slide block 54b, and a subsequent portion (not shown) is measured and dropped into second aperture 58a of first slide block 54a. Thereupon, the process repeats itself, continually and sequentially measuring and dispensing rough portions into each of the four final outlet conduits.

The coordinated operation of needle separator 32 and each of the slide block assemblies 20, 22, and 24, is controlled by controller 80, which precisely controls the speed, timing, direction, and all other aspects of motion of the slide blocks and separators. Controller 80 is preferably a programmable logic controller, or PLC, which incorporates a programmable and replaceable program chip so that the program may be altered from time to time as needed. For example, adjustment of the speed, timing, etc. of the slide blocks and other components may be required following conversion to a different product, expansion of the system, or conversion to different types of packaging machines.

To facilitate operation of the system, sensors and detectors of various types are desirable. For example, product sensor 82 (or more than one such sensor) may be disposed within inlet conduit 14 to allow controller 80 to cause the system to operate only when product is available, reducing needless wear on the machine. Other sensors may also be provided as desired, and one skilled in the art may devise any sensor/detector system to allow precise control of the system. For example, product sensors 84, similar to product sensor 82 may be disposed in inlet tube 86 of product measuring and packaging machine 12 to detect whether additional product is needed. Sensor 84 may send a signal to controller 80 if product accumulated in inlet tube 86 becomes too much or too little, causing the timing of needle separator 32 to change to allow more or less product to be dispensed to the corresponding outlet conduit 28. It will be apparent that controller 80 may independently adjust the timing of the needle separator 30 for each product packaging machine, thus allowing the system to accommodate product packaging machines with different capacities, whether intentional or not. Other sensors (not shown) may be associated with the product measuring and packaging machine 12 to detect whether it is operating properly, and sensors may also be provided to detect the precise position and function of slide blocks 54, needle separator 32, and knife gate 34 for the same purposes.

Product measuring and packaging machine 12 is also provided with a send product button 85. The sensors and send product button are connected to controller 80 by communication lines 88. Controller 80 is electrically connected to an actuator drive means 90 for powering actuators 36, 38, and 60. In the preferred embodiment, actuator drive means 90 comprises a pneumatic power source (i.e. a compressor) and is connected to pneumatic cylinders 36, 38, and 60 by high pressure pneumatic lines 92. Drive means 90 also preferably contains appropriate electronically controlled valves, etc. so that actuators 36, 38, and 60 may be controlled based on signals transmitted from controller 80. While a pneumatic system is presently preferred, other mechanical or electromechanical actuation systems may be employed. For example, rather than pneumatic cylinders, actuators 36, 38, and 60 may comprise servo motors, and drive means 90 may comprise an electric power source. In such a system, controller 80 directs current from the power source to each of the servos as needed to cause the required motion. As yet another alternative, the system may use hydraulic actuators.

Controller 80 is advantageously configured to adjust the operation of product distribution system 10 to allow for malfunctions in any of its parts or malfunction of any one or all of the product packaging machines 12. By detecting the presence of product in various places within the system, and also detecting the proper operation of container filling machines 12, controller 80 may prevent product from going down any one or more final outlet conduits 28A–D if any one or more filling machines malfinctions. For example, viewing FIG. 1A, if the container filling machine connected to final outlet conduit 28B malfunctions, controller 80 will detect this condition, and adjust accordingly. Specifically, assuming the three remaining container filling machines 12 are operating at full capacity, controller 80 will signal needle separator 32 to hesitate and not drop a rough portion 46c as depicted in FIG. 1B, because this portion would ultimately be discharged into outlet conduit 28B (FIG. 1D). Otherwise, the operation of the system remains the same. It will be apparent that this hesitation will cause the entire system to portion product 25% slower than normal, to account for the 25% loss of total capacity. Simultaneously, the controller may also cause slide blocks 54 to alter their timing and motion because portion 46c does not exist.

Likewise, because distribution system 10 is utilizing product at a rate 25% slower than normal in the present example, product will tend to back up in inlet 14. For this reason, an overflow mechanism 15 is disposed upstream of inlet 14, and allows excess product from mainline 17a to flow past inlet 14 and into mainline 17b so as to only allow inflow into the distribution system at a rate consistent with its reduced capacity. Mainline 17b is advantageously connected to some means (not shown) for dealing with product overflow, such as an auxiliary product packaging machine, or a temporary product storage reservoir, or a waste receptacle, for example.

The inventors have found, however, that for many product packaging operations it is desirable to only have three of four packaging machines running at any given time, and to send product to the distribution system at that rate, thus producing no waste. Having only three of four packaging machines operating at any given time allows maintenance personnel to load new packaging material, and then test and calibrate the fourth machine without interruption to the overall operation. Then, when the fourth machine is ready to come on line, one of the other three is ready to be taken off line for the same maintenance, and so forth.

To place a product filling machine 12 on-line while the product distribution system 10 is operating, the operator first starts the packaging machine to verify that it is operating properly. This may involve the production of a few empty packages, which are normally discarded. The operator then presses the send product button 85, which signals the controller 80 to adjust the motion of the rough portioner 18 so that product is sent down the outlet 28 corresponding to the packaging machine. To take a packaging machine off line, the operator presses the send product button 85 again, which stops any additional product from entering the corresponding outlet conduit 28. The packaging machine may then be run until the product which has accumulated in inlet tube 86 has been used up.

With the system 10 as shown in FIG. 1A, with first slide block 54a in its first position, second slide block 54b in its second position, and third slide block 54c in its second position, the adjusted operation will proceed as follows. First slide block 54a will slide to its second position, dropping a measured quantity into first aperture 56c of third slide block 54c, and second slide block 54b will move to its first position, dropping a measured portion into final outlet 28A. Immediately thereafter, a new measured portion will drop from conduit 14 into first aperture 56a of first slide block 54a, and second slide block 54b will return to its second position. This is phase one.

At the beginning of phase two, first slide block 54a returns to its first position, dropping a measured portion into the first aperture 56b of the second slide block, and simultaneously receiving a new measured portion from inlet 14 into second aperture 58a. At the same time, third slide block 54c moves to its first position, and a measured quantity is dropped into outlet C. This is phase two.

Finally, in phase three, first slide block 54a moves back to its second position, and third slide block 54c moves to its second position, dropping a measured quantity into outlet D, and receiving a measured quantity into first aperture 56c from second aperture 58a in the first slide block 54a. Immediately thereafter, first slide block 54a will return to its first position before receiving another measured quantity. This is phase three, and the cycle then repeats itself.

When operating in a non-standard mode, portioning mechanism 18 may maintain a uniform rate of operation at 75% of the normal rate, or it may pause in its cadence depending on which outlets are active. As noted above, knife gate 34 will close during such pauses to prevent damage to the product. Likewise, the motion of the various slide blocks will change during non-standard operation, as described above, so as to prevent the distribution of product into the inactive outlet. By this change in operation, a rough portion will not be separated and dropped into conduit B as in the normal operating sequence, advantageously allowing the packaging machine 12 connected thereto to be serviced or otherwise dealt with, while the packaging operation goes on uninterrupted.

The system thus described allows the efficient and rapid handling of long, sticky, fragile goods. It will be apparent, however, that the system as described is not limited to long goods, and may also be advantageously used with short goods such as maccaroni, penne noodles, orzo, etc. In an operative example of the system, the inventors have tested a complete system configured to distribute cooked spaghetti into four packaging machines configured to precisely measure and package the spaghetti into 9 oz. portions. The needle separator 32 and slide block assemblies 20, 22, and 24 were configured to measure out rough portions of approximately 30 oz. With the needle separator operating to produce these rough portions at 80 cycles/min., the entire system was able to produce 67 portions/min. per filling machine, or 268 portions/min. total. The inventors were able to maintain this production rate while simultaneously experiencing less than 2% damage to the product, which is well within acceptable range.

This product distribution system and method disclosed herein advantageously allows for diversion of product to multiple outlets while handling the product gently, and also allows for any one or more outlets to be automatically skipped during the operation of the machine. Accordingly, its operation meets the twin requirements of speed and lack of damage to the product. It is also very flexible and requires very low maintenance. It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A multipathway product distribution system comprising:
   a) a product inlet configured for receiving a single stream of product, the product inlet comprising a generally vertical conduit having an outlet;
   b) a rough portioner configured for dividing the stream of product into discrete portions;
   c) a diverter configured for directing the discrete portions into a plurality of final outlet streams; and
   wherein the rough portioner comprises:
   d) a needle separator having an actuator, disposed toward the top of the vertical conduit, comprising a plurality of generally horizontal parallel needles configured to reciprocate from a first position wherein the needles extend across the inside of the inlet conduit to substantially block passage of product therethrough, to a second retracted position wherein the needles do not extend across the inside of the inlet conduit; and
   e) whereby a discrete quantity of product may be allowed to drop toward the outlet of the inlet conduit depending upon to the length of time during which the needle separator is retracted.

2. The system of claim 1, further comprising:
   a) a knife gate having an actuator, disposed below the needle separator and above the outlet of the inlet conduit, and configured to selectively reciprocate from a first position wherein the knife gate extends across the inside of the inlet conduit to block passage of product therethrough, to a second retracted position wherein the inside of the inlet conduit is not blocked; and
   b) whereby product is prevented from entering the diverter when the knife gate is in the extended position.

3. A multipathway product distribution system comprising:
   a) a product inlet configured for receiving a single stream of product, the product inlet comprising a generally vertical conduit having an outlet;
   b) a rough portioner configured for dividing the stream of product into discrete portions;
   c) a diverter configured for directing the discrete portions into a plurality of final outlet streams; and
   wherein the rough portioner comprises:

d) first and second needle separators, disposed one above the other, comprising a plurality of generally horizontal parallel needles configured to reciprocate from a first position wherein the needles extend across the inside of the inlet conduit to substantially block passage of product therethrough, to a second retracted position wherein the needles do not extend across the inside of the inlet conduit; and e) first and second actuators, for causing independent horizontal reciprocation of the first and second needle separators, whereby a discrete quantity of product may be trapped between the first and second needle separators and then dropped toward the outlet of the inlet conduit by retracting the lower of the two separators.

4. A multipathway product distribution system comprising:

a) a product inlet configured for receiving a single stream of product, the product inlet comprising a generally vertical conduit having an outlet;

b) a rough portioner configured for dividing the stream of product into discrete portions;

c) a diverter configured for directing the discrete portions into a plurality of final outlet streams; and
wherein the diverter comprises:

d) first, second, and third slide block assemblies, each having an inlet and first and second outlets; and e) wherein the inlet of the first slide block assembly is connected to the outlet of the inlet conduit, the inlet of the second slide block assembly is connected to the first outlet of the first slide block assembly, the inlet of the third slide block assembly is connected to the second outlet of the first slide block assembly, and the first and second outlets of the second and third slide block assemblies are connected to each of four final outlet conduits, respectively.

5. The system of claim 4, wherein the slide block assemblies each further comprise:

a) a housing, having the inlet disposed in a top thereof, and the first and second outlets disposed in a bottom thereof;

b) a reciprocable slide block, disposed within the housing, formed of a substantially solid block of material, having a top, a bottom, and first and second apertures extending through the block from the top to the bottom; and c) a slide block actuator, for causing the slide block to reciprocate within the housing from a first position wherein the first aperture of the slide block is disposed above the fist outlet and the second aperture is disposed below the inlet, to a second position wherein the first aperture is disposed below the inlet and the second aperture is disposed above the second outlet.

6. The system of claim 5, further comprising downwardly directed fluid jets disposed in the top of each housing opposite the first and second outlets, to allow selective injection of fluid into the first or second aperture when disposed thereunder, to thereby help push the product out of said aperture and into the corresponding first or second outlet.

7. A multipathway product distribution system comprising:

a) product inlet configured for receiving a single stream of product;

b) a rough portioner configured for dividing the stream of product into discrete portions;

c) a diverter configured for directing the discrete portions into a plurality of final outlet streams;

d) container fillers, connected to each of the plurality of final outlet streams, for precisely measuring the product and placing it into containers;

e) a sensor, configured for sensing the functioning of the container fillers; and f) a controller, configured for receiving and processing signals from the sensor and adjusting the functioning of the rough portioner, the diverter, and the container fillers according to said signals, so as to selectively cause or prevent rough portions of product from entering any of the final outlet conduits.

8. The system of claim 7, further comprising sensors for detecting the presence of product in conduits within the system, and for sending signals indicative thereof to the controller.

9. The system of claim 8, wherein the sensors for detecting the presence of product in conduits within the system comprise at least sensors for detecting product within each of the final outlet conduits adjacent to the container fillers.

10. The system of claim 7, wherein the controller comprises a microprocessor.

11. The system of claim 10, wherein the controller comprises a programmable logic controller.

12. The system of claim 11, wherein the programmable logic controller comprises a programmable and removable program chip, whereby control programs may be selectively changed.

13. A multipathway product distribution system comprising:

a) a generally vertical product inlet conduit having an outlet, for receiving a single stream of product;

b) a rough portioner, disposed within the inlet conduit above the outlet, for dividing the single stream of product into discrete portions, comprising:

1) a needle separator having an actuator, disposed toward the top of the vertical conduit, comprising a plurality of generally horizontal parallel needles configured to reciprocate from a first position wherein the needles extend across the inside of the inlet conduit to substantially block passage of product therethrough, to a second retracted position wherein the needles do not extend across the inside of the inlet conduit; and 2) whereby a discrete quantity of product may be allowed to drop toward the outlet of the inlet conduit depending upon to the length of time during which the needle separator is retracted;

c) a diverter for directing the discrete portions into a plurality of outlet streams, comprising:

1) first, second, and third slide block assemblies, each slide block assembly comprising:

1) a housing having an inlet on a top thereof, and first and second outlets disposed in a bottom thereof;

2) a slide block disposed within the housing, formed of a substantially solid block of material, having a top, a bottom, and first and second apertures extending through the block from the top to the bottom;

3) a slide block actuator for causing the slide block to reciprocate within the housing from a first position wherein the first aperture of the slide block is disposed above the fist outlet and the second aperture is disposed below the inlet, to a second position wherein the first aperture is disposed below the inlet and the second aperture is disposed above the second outlet; and 2) wherein the inlet of the first slide block assembly is connected to the outlet of the inlet conduit, the inlet of the second slide block assembly is connected to the first outlet of the first slide block assembly, the inlet of the third slide block assembly is connected to the second outlet of the first slide block assembly, and the first and second outlets of the second and third slide block assemblies are connected to each of four final outlet conduits, respectively;

d) a knife gate having an actuator, disposed below the needle separator and above the outlet of the inlet conduit, and configured to selectively reciprocate from a first position wherein the knife gate extends across the inside of the inlet conduit to block passage of product therethrough, to a second retracted position wherein the inside of the inlet conduit is not blocked, whereby product is prevented from entering the diverter when the knife gate is in the extended position;

e) container fillers connected to the each of the four final outlet conduits for precisely measuring the product and placing it into containers;

f) sensors for sensing the functioning of the container fillers, and for at least detecting product in each of the four final outlet conduits adjacent to the container fillers; and g) a microprocessor controller for receiving and processing signals from the sensors and adjusting the timing of motion of the needle separator, and the first, second, and third slide blocks according to said signals so as to selectively cause or prevent rough portions of product from entering any of the final outlet conduits.

14. A method of dividing a single stream of long, sticky product into a plurality of product streams, comprising the steps of:
   a) receiving a single stream of product in a generally vertical inlet conduit having an outlet;
   b) roughly dividing the single stream of product into discrete portions;
   c) selectively directing the discrete portions of product into a plurality of final outlet streams;
   d) directing the plurality of outlet streams to a corresponding plurality of container filling machines;
   e) precisely measuring the product and placing it into containers;

wherein the step of roughly dividing the single stream of product into discrete portions further comprises the steps of:
   f) extending a needle separator, comprising a plurality of generally horizontal reciprocable parallel needles, across the inlet conduit to substantially block passage of product therethrough;
   g) retracting the needle separator for a brief period of time, thereby allowing product to flow past the needle separator toward the outlet of the inlet conduit; and
   h) forming a discrete portion by extending the needle separator across the inlet conduit through the mass of flowing product, to thereby substantially stop passage of additional product and separate a discrete portion below the needle separator from that portion stopped above.

15. A method of dividing a single stream of long, sticky product into a plurality of product streams, comprising the steps of:
   a) receiving a single stream of product in a generally vertical inlet conduit having an outlet;
   b) roughly dividing the single stream of product into discrete portions;
   c) selectively directing the discrete portions of product into a plurality of final outlet streams;

wherein the step of roughly dividing the single stream of product into discrete portions further comprises the steps of:
   d) extending a first needle separator, comprising a plurality of generally horizontal reciprocable parallel needles, across the inlet conduit to substantially block passage of product therethrough;
   e) forming a discrete portion of product, by extending a second needle separator disposed above the first needle separator and comprising a plurality of generally horizontal reciprocable parallel needles, across the inlet conduit so as to pass through the product, and divide the product above the first needle separator and below the second needle separator from the product above the second needle separator; and
   f) retracting the first needle separator, to allow the discrete portion to drop toward the outlet of the inlet conduit.

16. A method of dividing a single stream of long, sticky product into a plurality of product streams, comprising the steps of:
   a) receiving a single stream of product in a generally vertical inlet conduit having an outlet;
   b) roughly dividing the single stream of product into discrete portions;
   c) selectively directing the discrete portions of product into a plurality of final outlet streams;

wherein the step of selectively directing the discrete portions of product into a plurality of outlet streams further comprises the steps of:
   d) dropping the discrete portion into an inlet of a first slide block assembly, having first and second outlets; and
   e) actuating the first slide block assembly, to cause the discrete portion to drop through either the first or second outlet; and wherein the step of selectively directing the discrete portions of product into a plurality of outlet streams further comprises the steps of:
   f) dropping the discrete portion from either the first or second outlet of the first slide block assembly into an inlet of one or more subsequent slide block assemblies having an inlet and first and second outlets; and
   g) actuating the one or more subsequent slide block assemblies to cause the discrete portion to drop through either the first or second outlet thereof.

17. A method of dividing a single stream of long, sticky product into a plurality of product streams, comprising the steps of:
   a) receiving a single stream of product in a generally vertical inlet conduit having an outlet;
   b) roughly dividing the single stream of product into discrete portions;
   c) selectively directing the discrete portions of product into a plurality of final outlet streams;

d) directing the plurality of outlet streams to a corresponding plurality of container filling machines;

e) precisely measuring the product and placing it into containers;

f) sensing the functioning of the container filling means, and producing signals indicative of said functioning; and g) adjusting the functioning of the rough portioning means and the diverter means based upon said signals, according to a preprogrammed logic algorithm, so as to selectively cause or prevent rough portions of product from entering any one or more of the final outlet streams, or to modify the size of the rough portions.

18. The method of claim 17, further comprising the step of modifying the preprogrammed logic algorithm to selectively vary the method of dividing the single stream of long, sticky product into a plurality of product streams.

* * * * *